US012581125B2

(12) United States Patent (10) Patent No.: US 12,581,125 B2
Wenger et al. (45) Date of Patent: Mar. 17, 2026

(54) TRUNCATED BIT DEPTH SUPPORT SEI MESSAGES

(71) Applicant: Tencent America LLC, Palo Alto, CA (US)

(72) Inventors: Stephan Wenger, Hillsborough, CA (US); Xin Zhao, San Jose, CA (US); Ding Ding, Washington, DC (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 18/912,347

(22) Filed: Oct. 10, 2024

(65) Prior Publication Data

US 2025/0126298 A1 Apr. 17, 2025

Related U.S. Application Data

(60) Provisional application No. 63/543,970, filed on Oct. 13, 2023.

(51) Int. Cl.
*H04N 19/70* (2014.01)
*H04N 19/132* (2014.01)
(Continued)

(52) U.S. Cl.
CPC ........... *H04N 19/70* (2014.11); *H04N 19/132* (2014.11); *H04N 19/136* (2014.11); *H04N 19/172* (2014.11); *H04N 19/186* (2014.11)

(58) Field of Classification Search
CPC .... H04N 19/70; H04N 19/132; H04N 19/136; H04N 19/172; H04N 19/186
(Continued)

(56) References Cited

U.S. PATENT DOCUMENTS

| | | | |
|---|---|---|---|
| 6,778,709 B1* | 8/2004 | Taubman | H04N 19/70 |
| | | | 358/426.14 |
| 2011/0206123 A1* | 8/2011 | Panchal | H04N 19/147 |
| | | | 375/E7.243 |

(Continued)

FOREIGN PATENT DOCUMENTS

CN 113826382 A 12/2021

OTHER PUBLICATIONS

International Search Report and Written Opinion received for PCT Patent Application No. PCT/US2024/051121, mailed on Dec. 9, 2024, 11 pages.

*Primary Examiner* — Marnie A Matt
(74) *Attorney, Agent, or Firm* — ARENTFOX SCHIFF LLP

(57) ABSTRACT

A method of video decoding includes receiving a coded video bitstream comprising coded information of one or more coded pictures, the coded information includes an SEI message associated with at least a first picture in the one or more coded pictures, the SEI message includes at least a syntax element indicative of at least one of a forward truncation function for converting an original picture of a first bit depth to the first picture of a second bit depth and/or a reverse truncation function corresponding to the forward truncation function, the second bit depth is lower than the first bit depth. The method also includes reconstructing at least the first picture comprising first reconstructed samples based on the coded information, a numbering range of sample values of the first reconstructed samples is determined by at least one of the forward truncation function and/or the reverse truncation function.

20 Claims, 12 Drawing Sheets

(51) Int. Cl.
    *H04N 19/136*      (2014.01)
    *H04N 19/172*      (2014.01)
    *H04N 19/186*      (2014.01)

(58) Field of Classification Search
    USPC ................................................... 375/240.02
    See application file for complete search history.

(56) References Cited

U.S. PATENT DOCUMENTS

2012/0314026 A1    12/2012   Chen et al.
2022/0109816 A1     4/2022   Ray et al.

* cited by examiner

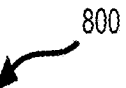

800 x.x.   Bit depth truncation SEI message x.x.x.   Bit depth truncation SEI message syntax

| bit_depth_truncation (payloadSize) { | Descriptor |
|---|---|
| bit_depth_truncation_cancel_flag | u(1) |
| if(!bit_depth_truncation_cancel_flag { | |
| bit_depth_truncation_param | u(3) |
| } | |
| } | |

801 — (row: bit_depth_truncation_cancel_flag)
802 — (row: if(!bit_depth_truncation_cancel_flag {)
803 — (row: bit_depth_truncation_param)

x.x.x.   Bit depth truncation SEI message semantics

The bit depth truncation (BDT) SEI message specifies various parameters of the left shift values that may be applied on the reconstructed frame samples before sending the reconstructed frame samples for further processing logic such as object detection or object tracking.

bit_depth_truncation_cancel_flag equal to 1 indicates that the SEI message cancels the persistence of any previous bit depth truncation SEI message in output order that applies to the current layer. bit_depth_truncation_cancel_flag equal to 0 indicates that bit depth shift information follows.

804 — bit_depth_truncation_param specifies the left shift value applied the sample values of the input image.

Depending on the value of bit_depth_truncation_param, the sample value shifting is specified as follows:

- If bit_depth_truncation_param is not equal to 0, the sample value shifting processing as specified by:

$$v = I[c][x][y] << bit\_depth\_truncation\_param \qquad (xx)$$

$$I[c][x][y] = v > (1 << bitDepth[c]) - 1)?(1 << bitDepth[c]) - 1 : I[c][x][y] \quad (xx)$$

- Otherwise (bit_depth_truncation_param is equal to 0), no further processing applied on I[c][x][y].

where I[c][x][y] represents the sample value at coordinates x, y of the colour component c of the input image I, bitDepth[c] is the number of bits used for each sample in a fixed-length unsigned binary representation of the arrays I[c][x][y], where c = 0..2, x = 0..PicWidethInLumaSamples − 1, and y = 0..PicHeightInLumaSamples − 1.

*FIG. 8* x.x.   Bit depth truncation SEI message x.x.x.   Bit depth truncation SEI message syntax

900

| bit_depth_truncation (payloadSize) { | Descriptor |
|---|---|
| bit_depth_truncation_cancel_flag | u(1) |
| if(!bit_depth_truncation_cancel_flag { | |
| bit_depth_truncation_param_luma | u(3) |
| bit_depth_truncation_param_cb | u(3) |
| bit_depth_truncation_param_cr | u(3) |
| } | |
| } | |

901, 902, 903 x.x.x.   Bit depth truncation SEI message semantics

The bit depth truncation (BDT) SEI message specifies various parameters of the left shift values that may be applied on the reconstructed image samples before sending the reconstructed image samples for further processing logic such as object detection or object tracking.

bit_depth_truncation_cancel_flag equal to 1 indicates that the SEI message cancels the persistence of any previous bit depth truncation SEI message in output order that applies to the current layer. bit_depth_truncation_cancel_flag equal to 0 indicates that bit depth shift information follows.

904 bit_depth_truncation_param_luma,   bit_depth_truncation_param_cb   and bit_depth_truncation_param_cr,   specifies the left shift value applied the sample values of the luma, Cb and Cr color components of the input image, respectively.

Depending on the value of bit_depth_truncation_param_luma, bit_depth_truncation_param_cb and bit_depth_truncation_param_cr, the sample value shifting is specified as follows:

- An array of variable bitDepthShiftFactor[c] is derived as follows:

$$\text{bitDepthShift}[0] = \text{bit\_depth\_truncation\_param\_luma} \qquad (xx)$$

$$\text{bitDepthShift}[1] = \text{bit\_depth\_truncation\_param\_cb} \qquad (xx)$$

$$\text{bitDepthShift}[2] = \text{bit\_depth\_truncation\_param\_cr} \qquad (xx)$$

For c = 0..2, the followings apply:

- If bitDepthShift[c] is not equal to 0, the sample value shifting processing as specified by:

$$v = I[c][x][y] << \text{bitDepthShift}[c] \qquad (xx)$$

$$I[c][x][y] = v > (1 << \text{bitDepth}[c]) - 1)?(1 << \text{bitDepth}[c]) - 1:I[c][x][y] \qquad (xx)$$

- Otherwise (bitDepthShift[c] is equal to 0), no further processing as specified by:

FIG. 9

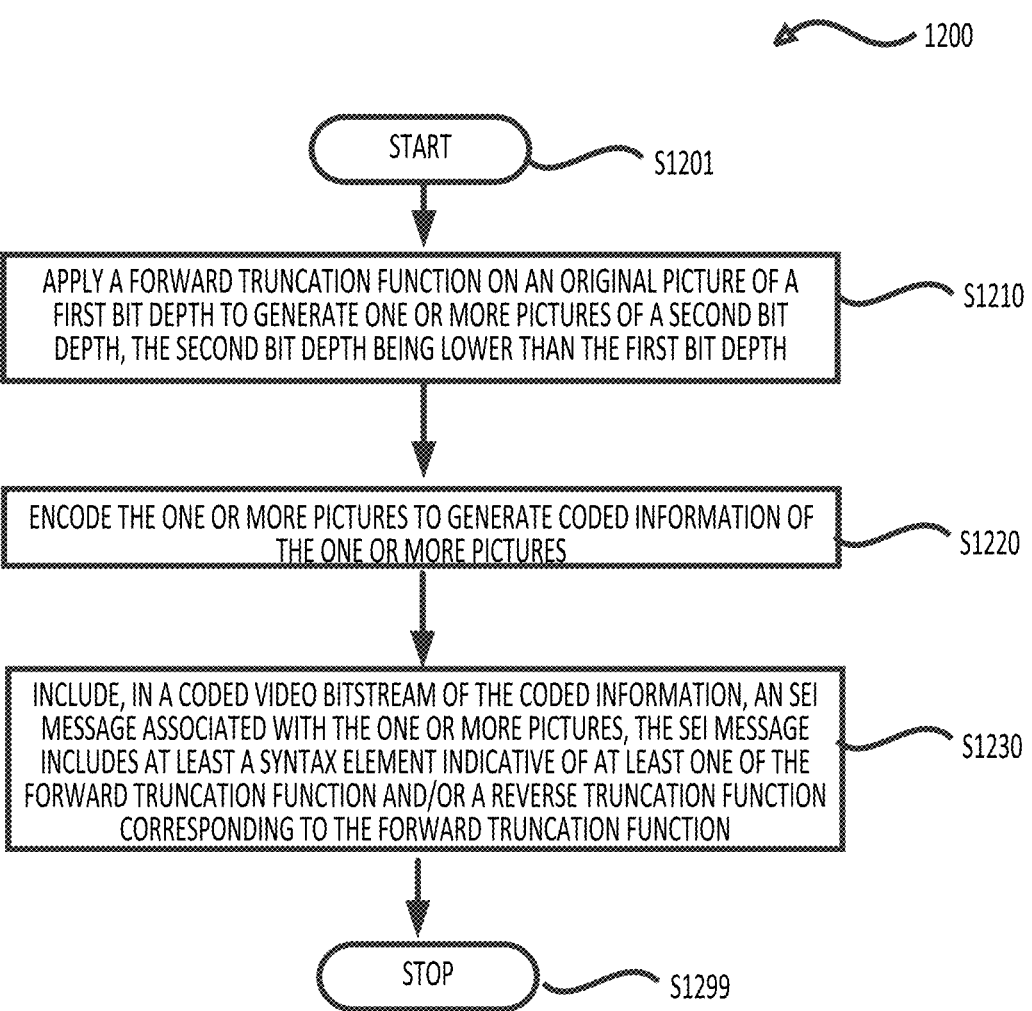

1200

START ～ S1201

APPLY A FORWARD TRUNCATION FUNCTION ON AN ORIGINAL PICTURE OF A FIRST BIT DEPTH TO GENERATE ONE OR MORE PICTURES OF A SECOND BIT DEPTH, THE SECOND BIT DEPTH BEING LOWER THAN THE FIRST BIT DEPTH ～ S1210

ENCODE THE ONE OR MORE PICTURES TO GENERATE CODED INFORMATION OF THE ONE OR MORE PICTURES ～ S1220

INCLUDE, IN A CODED VIDEO BITSTREAM OF THE CODED INFORMATION, AN SEI MESSAGE ASSOCIATED WITH THE ONE OR MORE PICTURES, THE SEI MESSAGE INCLUDES AT LEAST A SYNTAX ELEMENT INDICATIVE OF AT LEAST ONE OF THE FORWARD TRUNCATION FUNCTION AND/OR A REVERSE TRUNCATION FUNCTION CORRESPONDING TO THE FORWARD TRUNCATION FUNCTION ～ S1230

STOP ～ S1299

FIG. 12

TRUNCATED BIT DEPTH SUPPORT SEI MESSAGES

RELATED APPLICATION

The present application claims the benefit of priority to U.S. Provisional Application No. 63/543,970, "TRUNCATED BIT DEPTH SUPPORT SEI MESSAGES" filed on Oct. 13, 2023, which is incorporated by reference herein in its entirety.

TECHNICAL FIELD

The present disclosure describes embodiments generally related to video coding, including the signaling of optimizations of the video bitstream as applied by an encoder, for example in a video coding for machines scenario.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Image/video compression can help transmit image/video data across different devices, storage and networks with minimal quality degradation. In some examples, video codec technology can compress video based on spatial and temporal redundancy. In an example, a video codec can use techniques referred to as intra prediction that can compress an image based on spatial redundancy. For example, the intra prediction can use reference data from the current picture under reconstruction for sample prediction. In another example, a video codec can use techniques referred to as inter prediction that can compress an image based on temporal redundancy. For example, the inter prediction can predict samples in a current picture from a previously reconstructed picture with motion compensation. The motion compensation can be indicated by a motion vector (MV).

SUMMARY

Aspects of the disclosure include methods and apparatuses for video encoding/decoding. In some examples, an apparatus for video decoding/encoding includes processing circuitry.

A method of video decoding includes receiving a coded video bitstream comprising coded information of one or more coded pictures, the coded information includes a supplemental enhancement information (SEI) message associated with at least a first picture in the one or more coded pictures, the SEI message includes at least a syntax element indicative of at least one of a forward truncation function for converting an original picture of a first bit depth to the first picture of a second bit depth and/or a reverse truncation function corresponding to the forward truncation function, the second bit depth is lower than the first bit depth. The method also includes reconstructing at least the first picture comprising first reconstructed samples based on the coded information, a numbering range of sample values of the first reconstructed samples is determined by at least one of the forward truncation function and/or the reverse truncation function.

A method of video encoding includes applying a forward truncation function on an original picture of a first bit depth to generate one or more pictures of a second bit depth, the second bit depth being lower than the first bit depth; encoding the one or more pictures to generate coded information of the one or more pictures; and including, in a coded video bitstream of the coded information, a supplemental enhancement information (SEI) message associated with the one or more pictures, the SEI message comprising at least a syntax element indicative of at least one of the forward truncation function and/or a reverse truncation function corresponding to the forward truncation function.

Another method of video decoding includes receiving a coded video bitstream comprising coded information of one or more coded pictures, the coded information including a supplemental enhancement information (SEI) message associated with at least a first picture in the one or more coded pictures, the SEI message comprising at least a syntax element indicative of a conversion function between a first original picture of a first bit depth and the first picture of a second bit depth that is lower than the first bit depth, sample bits of the first picture being a subset of sample bits of the first original picture; and reconstructing at least the first picture comprising first reconstructed samples based on the coded information, a numbering range of sample values of the first reconstructed samples being determined based on the conversion function.

Some aspects of the disclosure provide a method of processing visual media data. The method includes processing a bitstream of visual media data according to a format rule. The bitstream includes coded information of one or more coded pictures, the coded information including a supplemental enhancement information (SEI) message associated with at least a first picture in the one or more coded pictures, the SEI message comprising at least a syntax element indicative of at least one of a forward truncation function for converting an original picture of a first bit depth to the first picture of a second bit depth and/or a reverse truncation function corresponding to the forward truncation function, the second bit depth being lower than the first bit depth. The format rule specifies that at least the first picture comprising first reconstructed samples is reconstructed based on the coded information, a numbering range of sample values of the first reconstructed samples being determined by at least one of the forward truncation function and/or the reverse truncation function.

According to another aspect of the disclosure, an apparatus is provided. The apparatus includes processing circuitry. The processing circuitry can be configured to perform any of the described methods for video decoding/encoding.

Aspects of the disclosure also provide a non-transitory computer-readable medium storing instructions which, when executed by a computer, cause the computer to perform any of the described methods for video decoding/encoding.

BRIEF DESCRIPTION OF THE DRAWINGS

Further features, the nature, and various advantages of the disclosed subject matter will be more apparent from the following detailed description and the accompanying drawings in which:

FIG. 8 shows a first example of syntax and semantics of a bit depth truncation SEI message.

FIG. 9 shows a second example of syntax and semantics of a bit depth truncation SEI message.

FIG. 12 shows a flow chart outlining an encoding process according to some embodiments of the disclosure.

DETAILED DESCRIPTION OF EMBODIMENTS

Figure 1:
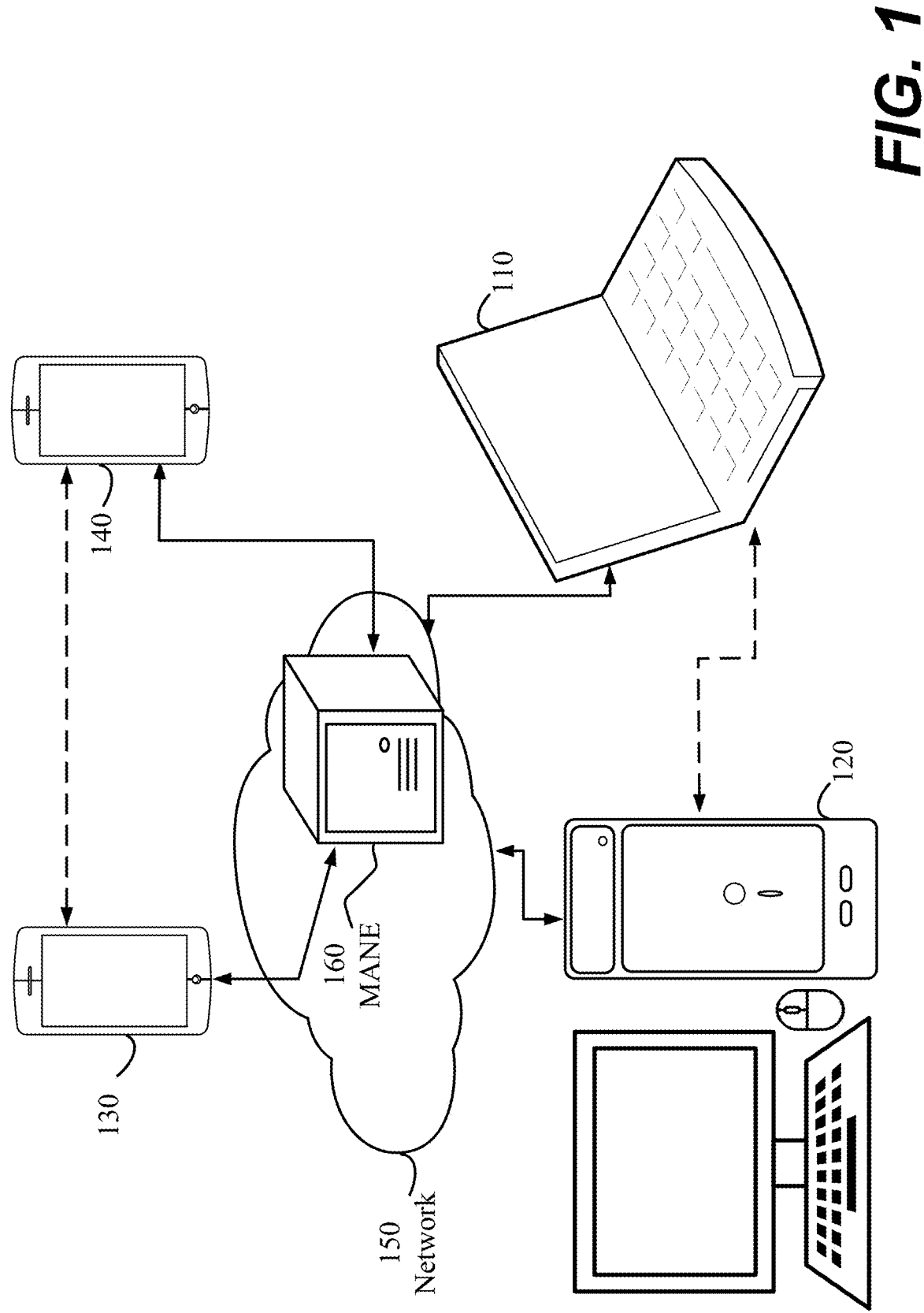
FIG. 1 shows a block diagram of a communication system in some examples.

Some aspects of the disclosure provide techniques of video coding (e.g., encoding and decoding). In some examples, the techniques are used in an SEI message indicative of the use of a modified numbering range for samples in a coded picture.

Video coding techniques can compress video data. In some examples, uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GByte of storage space.

Video coding techniques (e.g., encoding and decoding techniques) can reduce redundancy in the input video signal, through compression. Compression can help reducing aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signal is small enough to make the reconstructed signal useful for the intended application. In the case of video, lossy compression is widely employed. The amount of distortion tolerated depends on the application; for example, users of certain consumer streaming applications may tolerate higher distortion than users of television contribution applications. The compression ratio achievable can reflect that: higher allowable/tolerable distortion can yield higher compression ratios.

Video encoders and decoders can utilize techniques from several broad categories, including, for example, motion compensation, transform, quantization, and entropy coding, some of which will be introduced below.

Disclosed herein are systems and methods for video coding in at least one processor. For example, a method of video decoding can include receiving at least one picture including an SEI message comprising at least one syntax element indicative of at least one of a forward truncation function or a reverse truncation function; and reconstructing the coded picture comprising samples, in which the numbering range of the samples is determined by the at least one of the forward truncation function or the reverse truncation function that is indicated by the SEI message.

In certain environments, such as in video coding for consumption by machines (in contrast to humans), the requirement for a bitstream to pass a quality threshold based on human perception may not be required. Instead, the quality can be sufficient for machine consumption even if not adequate for human consumption.

In some examples, a technique to reduce the sample value range is used, the technique can use a preprocessing performed before encoding, and a corresponding post-processing after decoding. According to an aspect of the disclosure, doing so for natural sequences can lead to artifacts such as banding which are not pleasing to a human recipient, but may be acceptable for machine consumption (such as, for example image analysis for high-contrast content such as bar codes). In some examples, the bit depth of an VVC picture could be reduced from 10 bits to 5 bits—corresponding to 32 grayscale and color component levels. For example, in an original picture, 10 bits are used to represent grayscale levels, and after the bit depth reduction, 5 bits (e.g., the most significant 5 bits in the 10 bits, and the like) are used to represent grayscale levels. In some examples, when such a pre-processing is conducted before encoding, the decoder and associated processor need to know how the pre-processing was performed. Some aspects of the disclosure provide techniques for providing such information for video coding.

FIG. 1 shows a block diagram of a communication system (100) in some examples. The system (100) includes at least two terminals, such as a first terminal (110) and a second terminal (120) shown in FIG. 1, that are interconnected via a network (150). In some examples, unidirectional transmission of data is performed in the communication system (100). In an example, for the unidirectional transmission of data, the first terminal (110) can code video data at a local location for transmission to the second terminal (120) via the network (150). The second terminal (120) can receive the coded video data of the other terminal, such as the first terminal (110), from the network (150), decode the coded data and display the recovered video data. It is noted that unidirectional data transmission can be commonly used in media serving applications and the like.

FIG. 1 also shows a second pair of terminals, such as a third terminal (130) and a fourth terminal (140), that are configured to support bidirectional transmission of coded video that may occur, for example, during videoconferencing. For bidirectional transmission of data, each of the third terminal (130) and the fourth terminal (140) can code video data captured at a local location for transmission to the other terminal via the network (150). Each of the third terminal (130) and the fourth terminal (140) can also receive the coded video data transmitted by the other terminal, can decode the coded data and display the recovered video data at a local display device.

It is noted that while in FIG. 1, the terminals (110), (120), (130) and (140) are illustrated as servers, personal computers and smart phones, but the present disclosure is not limited to such terminal examples. Embodiments of the present disclosure can include application with laptop computers, tablet computers, media players and/or dedicated video conferencing equipment. The network (150) represents any number of networks that convey coded video data among the terminals (110), (120), (130) and (140), including for example wireline and/or wireless communication networks. The network (150) can exchange data in circuit-switched and/or packet-switched channels. Representative networks include telecommunications networks, local area networks, wide area networks and/or the Internet. For the purposes of the present discussion, the architecture and topology of the network (150) can be immaterial to the operation of the present disclosure unless explained herein below. In some examples, the network (150) includes Media Aware Network Elements (MANEs, 160) that may be included in the transmission path between, for example, the third terminal (130) and fourth terminal (140). In some examples, a MANE (160) can selective forward of parts of the media data to react to network congestions, media switching, media mixing, archival, and similar tasks commonly performed by a service provider rather than an end user. Such MANEs may be able to parse and react on a limited part of the media conveyed over the network, for example syntax elements related to the network abstraction layer of video coding technologies or standards.

Figure 2:
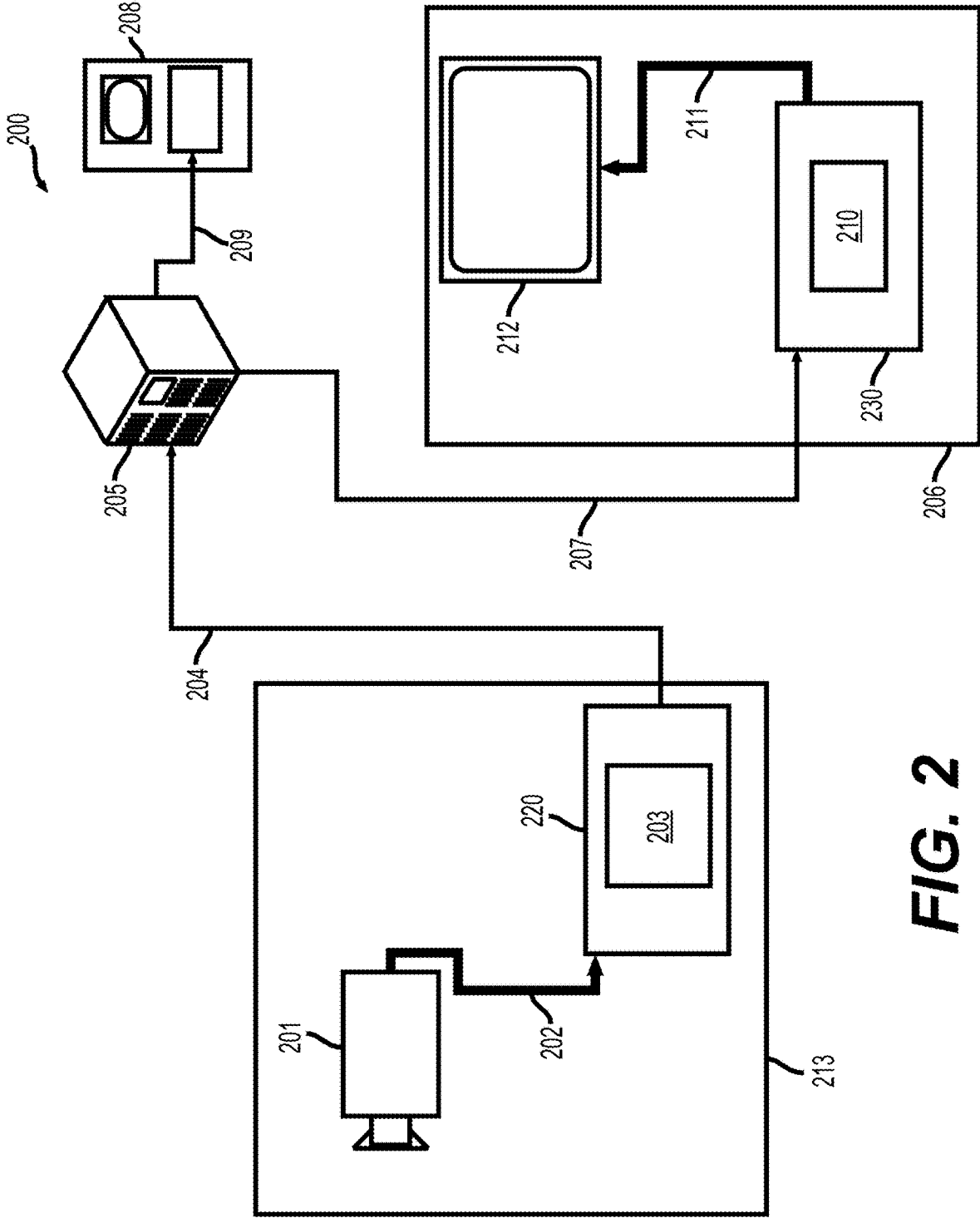
FIG. 2 shows a block diagram of a video processing system in some examples.

FIG. 2 shows a block diagram of a video processing system (200) in some examples. The video processing system (200) is an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

The video processing system (200) includes a capture subsystem (213), that can include a video source (201), for example a digital camera, creating for example a stream of video pictures (202) that are uncompressed. In an example, the stream of video pictures (202) includes samples that are taken by the digital camera. The stream of video pictures (202), depicted as a bold line to emphasize a high data volume when compared to encoded video data (204) (or coded video bitstreams), can be processed by an electronic device (220) that includes a video encoder (203) coupled to the video source (201). The video encoder (203) can include hardware, software, or a combination thereof to enable or implement aspects of the disclosed subject matter as described in more detail below. The encoded video data (204) (or encoded video bitstream), depicted as a thin line to emphasize the lower data volume when compared to the stream of video pictures (202), can be stored on a streaming server (205) for future use. One or more streaming client subsystems, such as client subsystems (206) and (208) in FIG. 2 can access the streaming server (205) to retrieve copies (207) and (209) of the encoded video data (204). A client subsystem (206) can include a video decoder (210), for example, in an electronic device (230). The video decoder (210) decodes the incoming copy (207) of the encoded video data and creates an outgoing stream of video pictures (211) that can be rendered on a display (212) (e.g., display screen) or other rendering device (not depicted). In some streaming systems, the encoded video data (204), (207), and (209) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (220) and (230) can include other components (not shown). For example, the electronic device (220) can include a video decoder (not shown) and the electronic device (230) can include a video encoder (not shown) as well.

Figure 3:
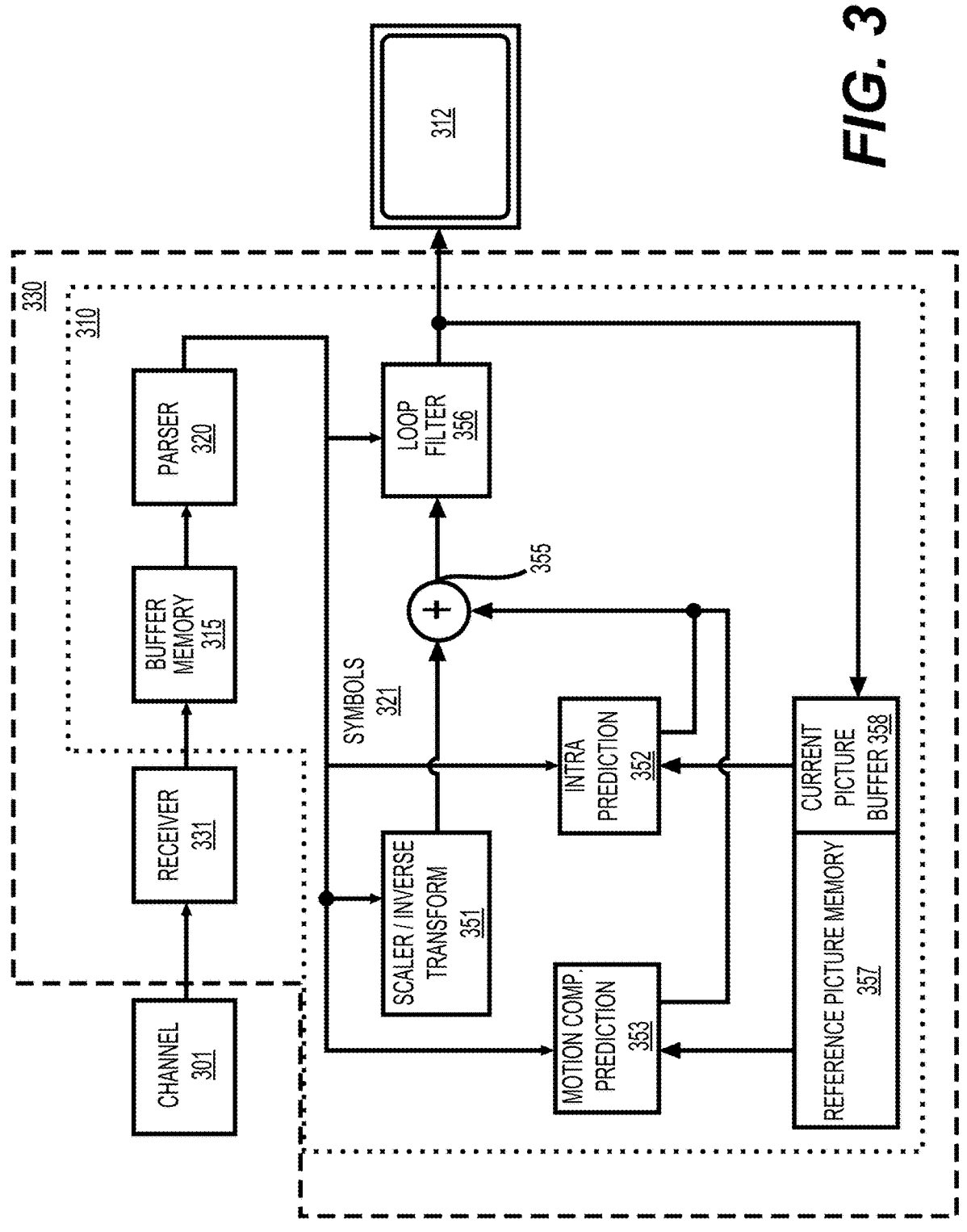
FIG. 3 shows an exemplary block diagram of a video decoder in some examples.

FIG. 3 shows an exemplary block diagram of a video decoder (310). The video decoder (310) can be included in an electronic device (330). The electronic device (330) can include a receiver (331) (e.g., receiving circuitry). The video decoder (310) can be used in the place of the video decoder (210) in the FIG. 2 example.

The receiver (331) can receive one or more coded video sequences, included in a bitstream for example, to be decoded by the video decoder (310). In an embodiment, one coded video sequence is received at a time, where the decoding of each coded video sequence is independent from the decoding of other coded video sequences. The coded video sequence may be received from a channel (301), which may be a hardware/software link to a storage device which stores the encoded video data. The receiver (331) may receive the encoded video data with other data, for example, coded audio data and/or ancillary data streams, that may be forwarded to their respective using entities (not depicted). The receiver (331) may separate the coded video sequence from the other data. To combat network jitter, a buffer memory (315) may be coupled in between the receiver (331) and an entropy decoder/parser (320) ("parser (320)" henceforth). In certain applications, the buffer memory (315) is part of the video decoder (310). In others, it can be outside of the video decoder (310) (not depicted). In still others, there can be a buffer memory (not depicted) outside of the video decoder (310), for example to combat network jitter, and in addition another buffer memory (315) inside the video decoder (310), for example to handle playout timing. When the receiver (331) is receiving data from a store/forward device of sufficient bandwidth and controllability, or from an isosynchronous network, the buffer memory (315) may not be needed, or can be small. For use on best effort packet networks such as the Internet, the buffer memory (315) may be required, can be comparatively large and can be advantageously of adaptive size, and may at least partially be implemented in an operating system or similar elements (not depicted) outside of the video decoder (310).

The video decoder (310) may include the parser (320) to reconstruct symbols (321) from the coded video sequence. Categories of those symbols include information used to manage operation of the video decoder (310), and potentially information to control a rendering device such as a render device (312) (e.g., a display screen) that is not an integral part of the electronic device (330) but can be coupled to the electronic device (330), as shown in FIG. 3. The control information for the rendering device(s) may be in the form of Supplemental Enhancement Information (SEI) messages or Video Usability Information (VUI) parameter set fragments (not depicted). The parser (320) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (320) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (320) may also extract from the coded video sequence information such as transform coefficients, quantizer parameter values, motion vectors, and so forth.

The parser (320) may perform an entropy decoding/parsing operation on the video sequence received from the buffer memory (315), so as to create symbols (321).

Reconstruction of the symbols (321) can involve multiple different units depending on the type of the coded video picture or parts thereof (such as: inter and intra picture, inter and intra block), and other factors. Which units are involved, and how, can be controlled by subgroup control information parsed from the coded video sequence by the parser (320). The flow of such subgroup control information between the parser (320) and the multiple units below is not depicted for clarity.

Beyond the functional blocks already mentioned, the video decoder (310) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (351). The scaler/inverse transform unit (351) receives a quantized transform coefficient as well as control information, including which transform to use, block size, quantization factor, quantization scaling matrices, etc. as symbol(s) (321) from the parser (320). The scaler/inverse transform unit (351) can output blocks comprising sample values, that can be input into aggregator (355).

In some cases, the output samples of the scaler/inverse transform unit (351) can pertain to an intra coded block. The intra coded block is a block that is not using predictive information from previously reconstructed pictures, but can use predictive information from previously reconstructed parts of the current picture. Such predictive information can be provided by an intra picture prediction unit (352). In some cases, the intra picture prediction unit (352) generates a block of the same size and shape of the block under reconstruction, using surrounding already reconstructed information fetched from the current picture buffer (358). The current picture buffer (358) buffers, for example, partly reconstructed current picture and/or fully reconstructed current picture. The aggregator (355), in some cases, adds, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated, block. In such a case, a motion compensation prediction unit (353) can access reference picture memory (357) to fetch samples used for prediction. After motion compensating the fetched samples in accordance with the symbols (321) pertaining to the block, these samples can be added by the aggregator (355) to the output of the scaler/inverse transform unit (351) (in this case called the residual samples or residual signal) so as to generate output sample information. The addresses within the reference picture memory (357) from where the motion compensation prediction unit (353) fetches prediction samples can be controlled by motion vectors, available to the motion compensation prediction unit (353) in the form of symbols (321) that can have, for example X, Y, and reference picture components. Motion compensation also can include interpolation of sample values as fetched from the reference picture memory (357) when sub-sample exact motion vectors are in use, motion vector prediction mechanisms, and so forth.

The output samples of the aggregator (355) can be subject to various loop filtering techniques in the loop filter unit (356). Video compression technologies can include in-loop filter technologies that are controlled by parameters included in the coded video sequence (also referred to as coded video bitstream) and made available to the loop filter unit (356) as symbols (321) from the parser (320). Video compression can also be responsive to meta-information obtained during the decoding of previous (in decoding order) parts of the coded picture or coded video sequence, as well as responsive to previously reconstructed and loop-filtered sample values.

The output of the loop filter unit (356) can be a sample stream that can be output to the render device (312) as well as stored in the reference picture memory (357) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (320)), the current picture buffer (358) can become a part of the reference picture memory (357), and a fresh current picture buffer can be reallocated before commencing the reconstruction of the following coded picture.

The video decoder (310) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (331) may receive additional (redundant) data with the encoded video. The additional data may be included as part of the coded video sequence(s). The additional data may be used by the video decoder (310) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 4:
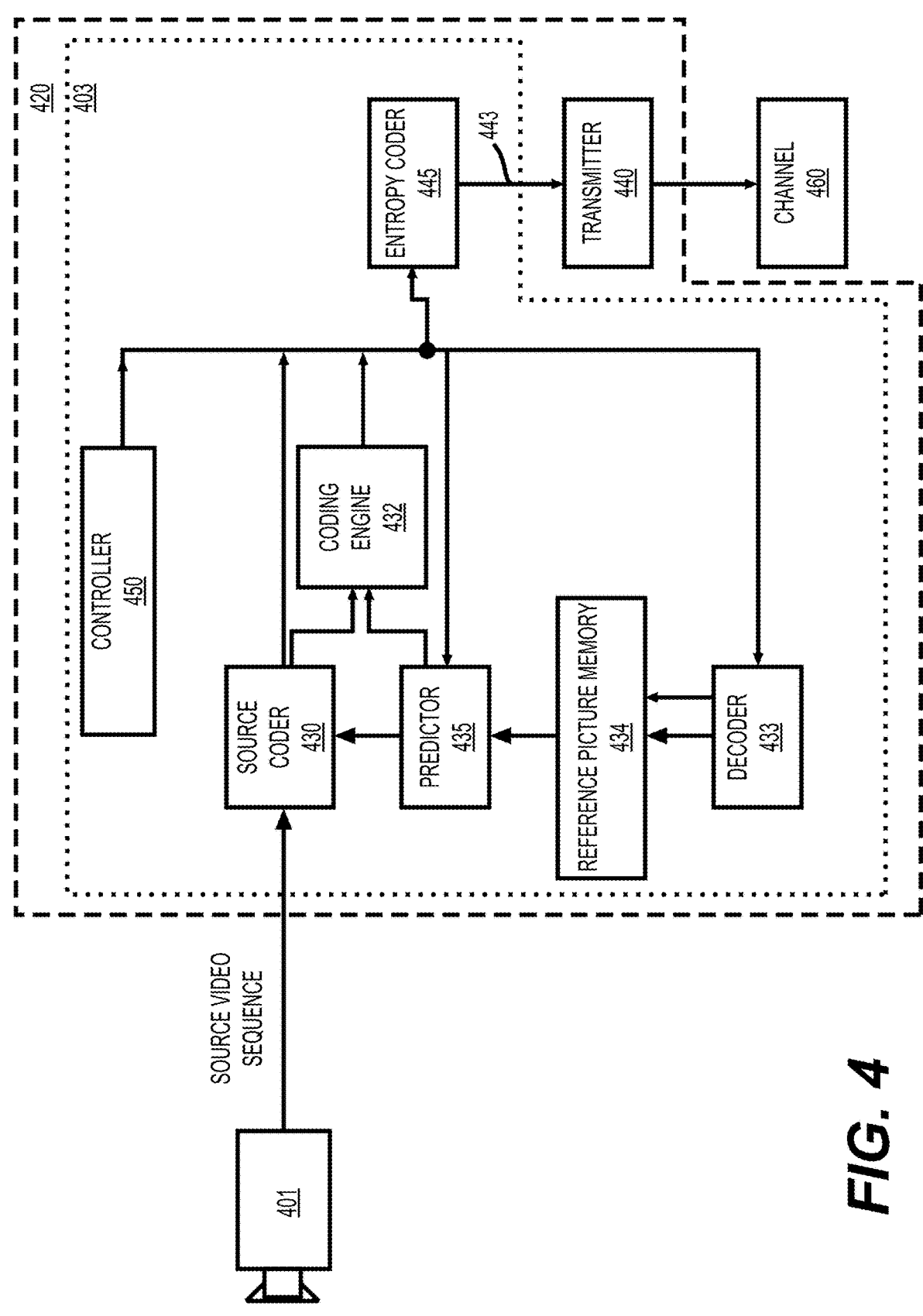
FIG. 4 shows an exemplary block diagram of a video encoder in some examples.

FIG. 4 shows an exemplary block diagram of a video encoder (403). The video encoder (403) is included in an electronic device (420). The electronic device (420) includes a transmitter (440) (e.g., transmitting circuitry). The video encoder (403) can be used in the place of the video encoder (203) in the FIG. 2 example.

The video encoder (403) may receive video samples from a video source (401) (that is not part of the electronic device (420) in the FIG. 4 example) that may capture video image(s) to be coded by the video encoder (403). In another example, the video source (401) is a part of the electronic device (420).

The video source (401) may provide the source video sequence to be coded by the video encoder (403) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (401) may be a storage device storing previously prepared video. In a videoconferencing system, the video source (401) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. The description below focuses on samples.

According to an embodiment, the video encoder (403) may code and compress the pictures of the source video sequence into a coded video sequence (443) in real time or under any other time constraints as required. Enforcing appropriate coding speed is one function of a controller (450). In some embodiments, the controller (450) controls other functional units as described below and is functionally coupled to the other functional units. The coupling is not depicted for clarity. Parameters set by the controller (450) can include rate control related parameters (picture skip, quantizer, lambda value of rate-distortion optimization techniques, . . . ), picture size, group of pictures (GOP) layout, maximum motion vector search range, and so forth. The controller (450) can be configured to have other suitable functions that pertain to the video encoder (403) optimized for a certain system design.

In some embodiments, the video encoder (403) is configured to operate in a coding loop. As an oversimplified description, in an example, the coding loop can include a source coder (430) (e.g., responsible for creating symbols, such as a symbol stream, based on an input picture to be coded, and a reference picture(s)), and a (local) decoder (433) embedded in the video encoder (403). The decoder (433) reconstructs the symbols to create the sample data in a similar manner as a (remote) decoder also would create. The reconstructed sample stream (sample data) is input to the reference picture memory (434). As the decoding of a symbol stream leads to bit-exact results independent of decoder location (local or remote), the content in the reference picture memory (434) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (433) can be the same as a "remote" decoder, such as the video decoder (310), which has already been described in detail above in conjunction with FIG. 3. Briefly referring also to FIG. 3, however, as symbols are available and encoding/decoding of symbols to a coded video sequence by an entropy coder (445) and the parser (320) can be lossless, the entropy decoding parts of the video decoder (310), including the buffer memory (315), and parser (320) may not be fully implemented in the local decoder (433).

In an embodiment, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (430) may perform motion compensated predictive coding, which codes an input picture predictively with reference to one or more previously coded picture from the video sequence that were designated as "reference pictures." In this manner, the coding engine (432) codes differences between pixel blocks of an input picture and pixel blocks of reference picture(s) that may be selected as prediction reference(s) to the input picture.

The local video decoder (433) may decode coded video data of pictures that may be designated as reference pictures, based on symbols created by the source coder (430). Operations of the coding engine (432) may advantageously be lossy processes. When the coded video data may be decoded at a video decoder (not shown in FIG. 4), the reconstructed video sequence typically may be a replica of the source video sequence with some errors. The local video decoder (433) replicates decoding processes that may be performed by the video decoder on reference pictures and may cause reconstructed reference pictures to be stored in the reference picture memory (434). In this manner, the video encoder (403) may store copies of reconstructed reference pictures locally that have common content as the reconstructed reference pictures that will be obtained by a far-end video decoder (absent transmission errors).

The predictor (435) may perform prediction searches for the coding engine (432). That is, for a new picture to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures. The predictor (435) may operate on a sample block-by-pixel block basis to find appropriate prediction references. In some cases, as determined by search results obtained by the predictor (435), an input picture may have prediction references drawn from multiple reference pictures stored in the reference picture memory (434).

The controller (450) may manage coding operations of the source coder (430), including, for example, setting of parameters and subgroup parameters used for encoding the video data.

Output of all aforementioned functional units may be subjected to entropy coding in the entropy coder (445). The entropy coder (445) translates the symbols as generated by the various functional units into a coded video sequence, by applying lossless compression to the symbols according to technologies such as Huffman coding, variable length coding, arithmetic coding, and so forth.

The transmitter (440) may buffer the coded video sequence(s) as created by the entropy coder (445) to prepare for transmission via a communication channel (460), which may be a hardware/software link to a storage device which would store the encoded video data. The transmitter (440) may merge coded video data from the video encoder (403) with other data to be transmitted, for example, coded audio data and/or ancillary data streams (sources not shown).

The controller (450) may manage operation of the video encoder (403). During coding, the controller (450) may assign to each coded picture a certain coded picture type, which may affect the coding techniques that may be applied to the respective picture. For example, pictures often may be assigned as one of the following picture types:

An Intra Picture (I picture) may be coded and decoded without using any other picture in the sequence as a source of prediction. Some video codecs allow for different types of intra pictures, including, for example Independent Decoder Refresh ("IDR") Pictures.

A predictive picture (P picture) may be coded and decoded using intra prediction or inter prediction using a motion vector and reference index to predict the sample values of each block.

A bi-directionally predictive picture (B Picture) may be coded and decoded using intra prediction or inter prediction using two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (403) may perform coding operations according to a predetermined video coding technology or standard, such as ITU-T Rec. H.265. In its operation, the video encoder (403) may perform various compression operations, including predictive coding operations that exploit temporal and spatial redundancies in the input video sequence. The coded video data, therefore, may conform to a syntax specified by the video coding technology or standard being used.

In an embodiment, the transmitter (440) may transmit additional data with the encoded video. The source coder (430) may include such data as part of the coded video sequence. Additional data may comprise temporal/spatial/SNR enhancement layers, other forms of redundant data such as redundant pictures and slices, supplementary enhancement information (SEI) messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

It is noted that the video encoders (203) and (403), and the video decoders (210) and (310) can be implemented using any suitable technique. In an embodiment, the video encoders (203) and (403) and the video decoders (210) and (310) can be implemented using one or more integrated circuits. In another embodiment, the video encoders (203) and (403), and the video decoders (210) and (310) can be implemented using one or more processors that execute software instructions.

According to some aspects of the disclosure, a video coding can be used in machine scenarios.

Figure 5:
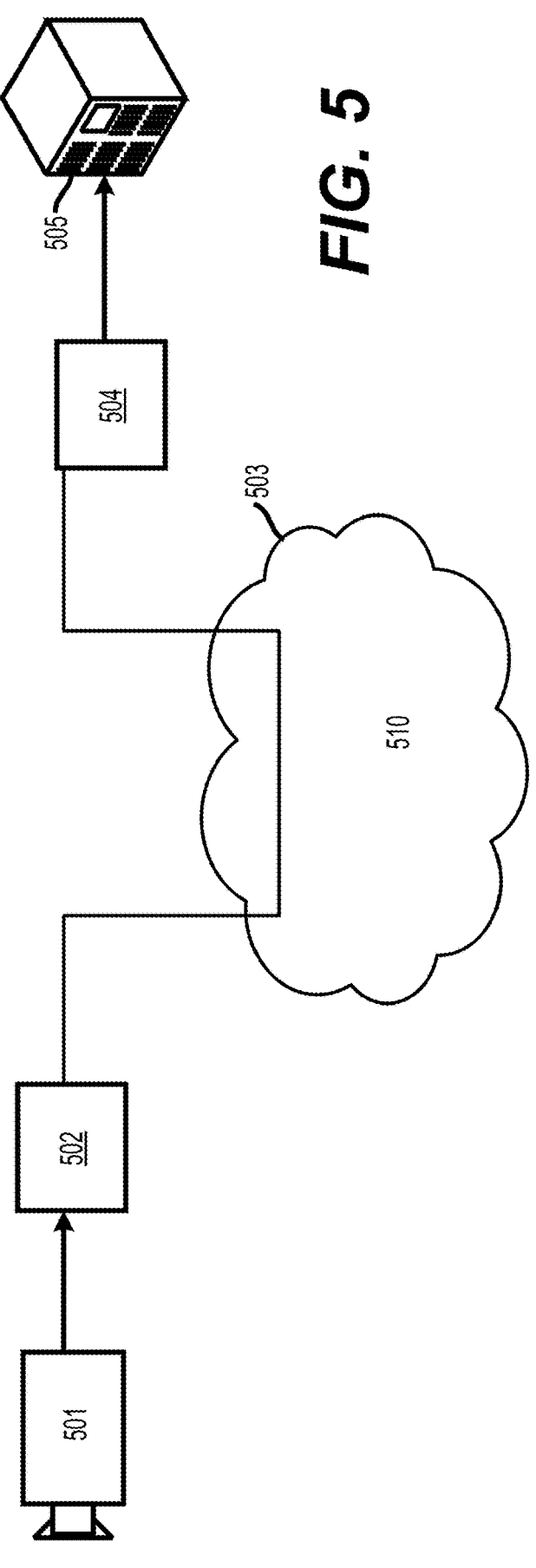
FIG. 5 shows a block diagram of a video processing system in a machine scenario in some examples.

FIG. 5 shows a block diagram of a video processing system (500) in a machine scenario in some examples. In the FIG. 5 example, the video processing system (500) includes a plurality of video sources for machine consumption. For example, the video processing system (500) includes a camera (501) coupled to an encoder device (502).

In some examples, an encoder can be optimized for machine consumption. For example, the encoder device (502) is optimized for encoding bitstreams for machine consumption. For example, the encoder device (502) is coupled, via a network (503), to a decoder device (504), and the decoder device (504) is coupled to a machine (505) that consumes the decoded video (e.g., perform further analysis, detection, and the like on the video). Thus, an encoded bitstream can be provided from the encoder device (502) to the decoder device (504) via the network (503), and the encoded bitstream can be decoded by the decoder device (504), and the decoded video data can be further processed by the machine (505).

Compressed video can be augmented, in the video bitstream, by supplementary enhancement information, for example in the form of Supplementary Enhancement Information (SEI) Messages or Video Usability Information (VUI). In some examples, video coding standards can include specifications for SEI and VUI. In some examples, SEI and VUI information may also be specified in stand-alone specifications that may be referenced by the video coding specifications.

Some aspects of the present disclosure provide techniques to use one or more SEI messages to support conversion of bit depths during video processing. For example, an SEI message includes at least one syntax element indicative of number interpretation being modified due to an operation on image samples before encoding.

In some examples, the coded information of one or more coded picture includes a supplemental enhancement information (SEI) message associated with at least a first picture in the one or more coded pictures, the SEI message includes at least a syntax element indicative of at least one of a forward truncation function for converting an original picture of a first bit depth to the first picture of a second bit depth and/or a reverse truncation function corresponding to the forward truncation function, the second bit depth being lower than the first bit depth. At least the first picture comprising first reconstructed samples are reconstructed based on the coded information, a numbering range of sample values of the first reconstructed samples being determined by at least one of the forward truncation function and/or the reverse truncation function.

In an example, an SEI message indicates that a bit depth of 5 bits is used instead of 10 bits. In another example, an SEI message indicates that a sample of a bit depth of 16 bits is converted to multiple samples having a bit depth of 10 bits. The SEI messages can be any suitable SEI messages, such as a dedicated bit depth truncation support SEI message (also referred to as bit depth truncation SEI message) in a coded video sequence, an encoder optimization information (EOI) SEI message and the like.

Figure 6:
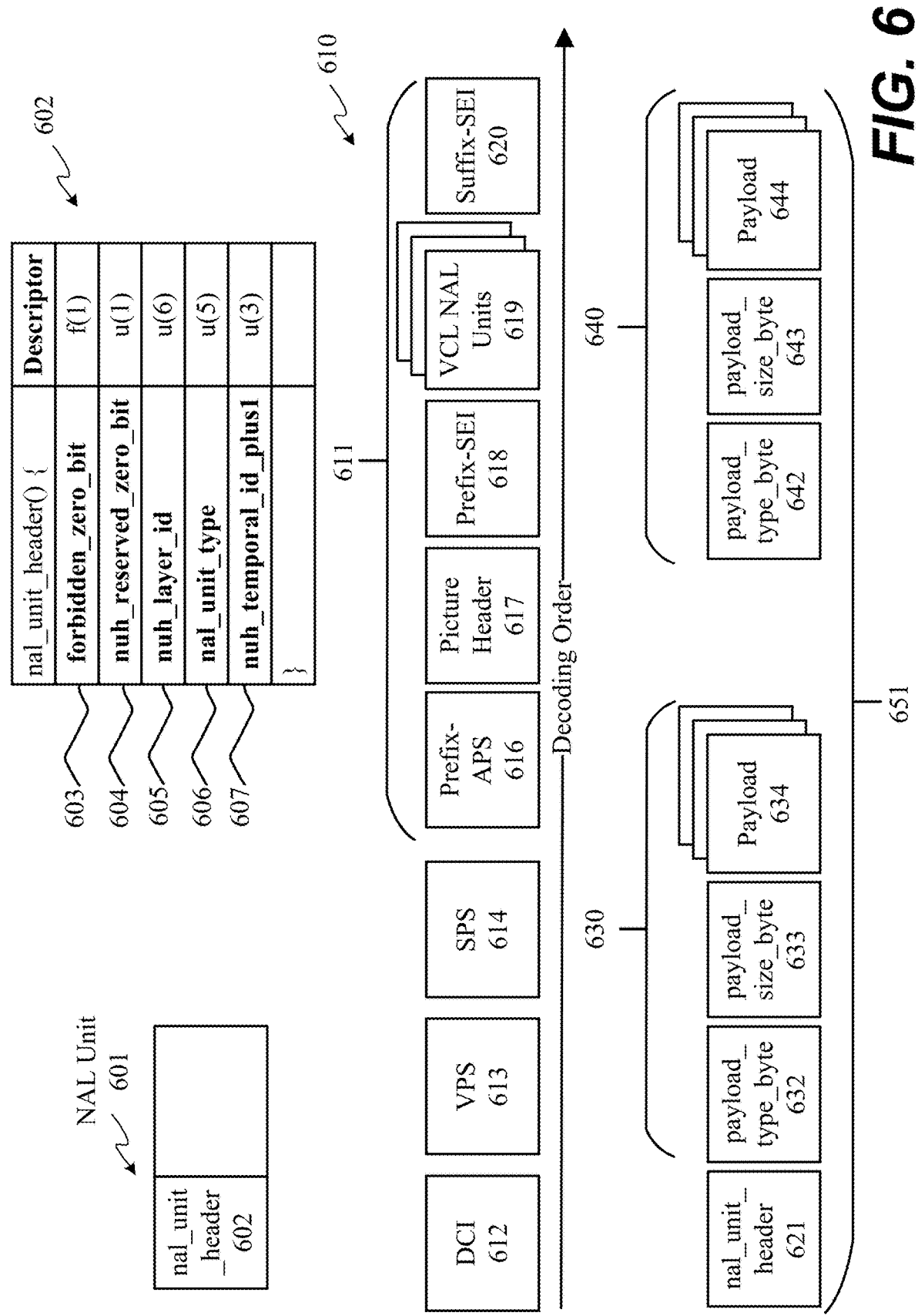
FIG. 6 shows a layout of a coded video sequence (CVS) in some examples.

FIG. 6 shows a layout of a coded video sequence (CVS) in some examples, such as in accordance with H.266. The coded video sequence is subdivided into network abstraction layer units (NAL units), such as an NAL unit (601) in FIG. 6. In the FIG. 6 example, the NAL unit (601) can include a NAL unit header (602). In some examples, the NAL unit header (602) includes 16 bits. In the FIG. 6 example, the NAL unit header (602) includes a first bit of forbidden_zero_bit (603) and a second bit of nuh_reserved_zero_bit 604). In an example, the first bit and the second bit are unused by H.266 and are set to zero in a NAL unit compliant with H.266.

Further, in the FIG. 6 example, the NAL unit header (602) includes six bits of nuh_layer_id (605) that may be indicative of the (spatial, SNR, or multiview enhancement) layer to which the NAL unit (601) belongs to. Also, the NAL unit header (602) includes five bits of nuh_nal_unit_type (606) that define the type of NAL unit (601). In some examples (e.g., H.266), among the 32 values represented by the five bits, 22 NAL unit type values are defined for NAL unit types, six NAL unit types are reserved, and four NAL unit type values are unspecified and can be used by specifications other than H.266. Finally, the NAL unit header (602) includes three bits of nuh_temporal_id_plus1 (606) to indicate the temporal layer to which the NAL unit (601) belongs to.

NAL units are classified into video coding layer (VCL) and non-VCL NAL units. The VCL NAL units include the data that represents the values of the samples in the video pictures, and the non-VCL NAL units contain any associated additional information such as parameter sets and supplemental enhancement information (SEI).

In some examples, a coded picture can include one or more Video Coding Layer (VCL) NAL units and zero or more non-VCL NAL units. VCL NAL units may contain coded data conceptually belonging to a video coding layer as introduced before. Non-VCL NAL units may contain data conceptually belonging data not conceptually belonging to the video coding layer. Using H.266 as an example, the Non-VCL NAL units can be categorized into for example following 6 categories:

(1) Parameter sets, which include information that can be necessary for the decoding process and can be applied to more than one coded picture. Parameter sets and conceptually similar NAL units may be of NAL unit types, such as DCI_NUT (Decoding Capability Information (DCI)), VPS_NUT (Video Parameter Set (VPS), establishing, among other things, layer relationships), SPS_NUT (Sequence Parameter Set (SPS), establishing, among other things, parameters used and staying constant throughout a coded video sequence CVS), PPS_NUT (Picture Parameter Set (PPS), establishing, among other things, parameter used and staying constant within a coded picture), and PREFIX_APS_NUT and SUFFIX_APS_NUT (prefix and suffix Adaptation Parameter Sets). Parameter sets may include information required for a decoder to decode VCL NAL units, and hence are referred here as "normative" NAL units.

(2) Picture Header (PH_NUT), which is also a "normative" NAL unit.

(3) NAL units marking certain places in a NAL unit stream. The third category includes NAL units with the NAL unit types AUD_NUT (Access Unit Delimiter), EOS_NUT (End of Sequence) and EOB_NUT (End of Bitstream). The third category of NAL units are non-normative, also known as informative, in the sense that a compliant decoder does not require them for its decoding process, although it needs to be able to receive them in the NAL unit stream.

(4) Prefix and Suffix SEI Nal unit types (PREFIX_SEI_NUT and SUFFIX_SEI_NUT) which indicate NAL units containing Prefix and Suffix supplementary enhancement information. In some examples (e.g., in H.266), the fourth category of NAL units are informative, as they are not required for the decoding process.

(5) Filler Data NAL unit type FD_NUT indicates filler data; data that can be random and can be used to "waste" bits in a NAL unit stream or bitstream, which may be necessary for the transport over certain isochronous transport environments.

(6) Reserved and Unspecified NAL unit types.

FIG. 6 also shows a layout of a NAL unit stream (610) in a decoding order in some examples. The NAL unit stream (610) includes a coded picture (611). The NAL unit stream (610) includes, somewhere earlier than the coded picture (611), DCI (612), VPS (613), and SPS (614). DCI (612), VPS (613), and SPS (614) may, in combination, establish the parameters which the decoder can use to decode the coded pictures of a coded video sequence (CVS), including the coded picture (611) in the NAL unit stream (610).

In the FIG. 6 example, the coded picture (611) can include, in the depicted order or any other order compliant with the video coding technology or standard in use (such as H.266 in the present disclosure): a prefix APS (616), picture header (PH, 617), prefix SEI (618), one or more VCL NAL units (619), and suffix SEI (620).

In some examples, prefix and suffix SEI NAL units (618) and (620) are configured during the standards development as, for some SEI messages, the content of the message would be known before the coding of a given picture commences, whereas other content would only be known once the picture were coded. Allowing certain SEI messages to appear early or late in a coded picture's NAL unit stream through prefix and suffix SEIs allows avoiding buffering. For example, in an encoder, the sampling time of a picture to be coded is known before the picture is coded, and hence the picture timing SEI message can be a prefix SEI message (618). On the other hand, a decoded picture hash SEI message, which contains a hash of the sample values of a decoded pictures and can be useful, for example, to debug encoder implementations, is a suffix SEI message (620) as an encoder cannot calculate a hash over reconstructed samples before a picture has been coded. The location of prefix and suffix SEI NAL units may not be restricted to their position in the NAL unit stream. The phrase "prefix" and "suffix" may imply to what coded pictures or NAL units the prefix/suffix SEI message may pertain to, and the details of this applicability may be specified, for example in the semantics description of a given SEI message.

FIG. 6 also shows a diagram of a syntax of a NAL unit (651) that contains a prefix or suffix SEI message. The syntax is a container format for multiple SEI messages that can be carried in one NAL unit (also referred to as SEI NAL unit). Details of the emulation prevention syntax specified in H.266 are omitted here for clarity. As other NAL units, an SEI NAL unit starts with a NAL unit header (621). The NAL unit header (621) is followed by one or more SEI messages, such as a first SEI message (630) and a second SEI message (640) in FIG. 6. Each SEI message inside the NAL unit (651) includes an 8 bit payload_type_byte which specifies one of 256 different SEI types, such as shown by payload_type_byte (632) and payload_type_byte (642) in FIG. 6. Further, each SEI message inside the NAL unit (651) includes an 8 bit payload_size_byte which specifies the number of bytes of the SEI payload, such as shown by payload_size_byte (633) and payload_size_byte (643) in FIG. 6. Then, each SEI message inside the NAL unit (651) includes SEI payload with the number of bytes specified by payload_size_byte, such as the payload (634) and the payload (644). In some examples, the structure can be repeated until a payload_type_byte equal to 0xff is observed, which indicates the end of the NAL unit. The syntax of the payload depends on the SEI message, it can be of any length between 0 and 255 bytes.

Figure 7:
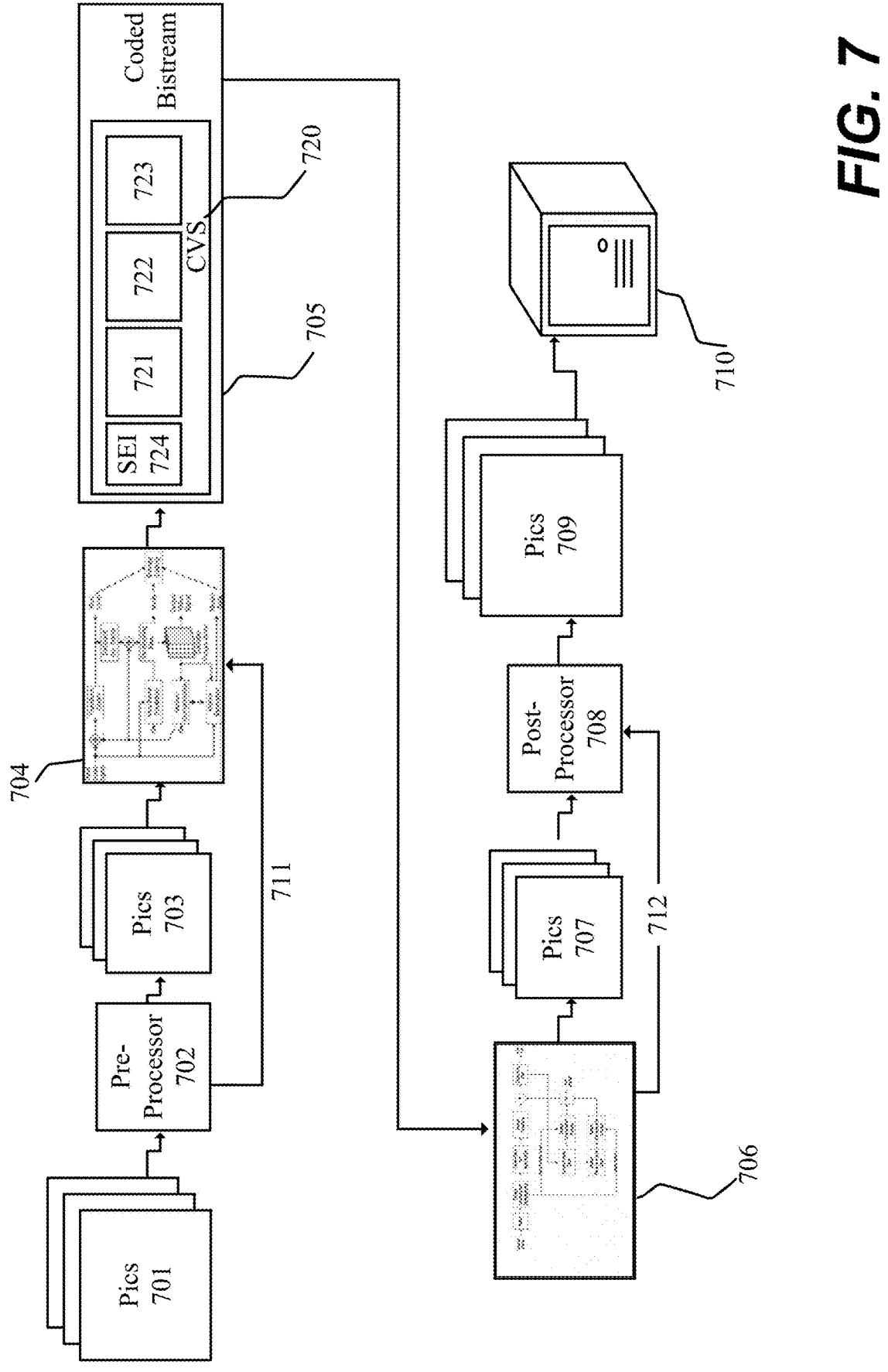
FIG. 7 shows a diagram of a video processing chain in some examples.

FIG. 7 shows a diagram of a video processing chain in some examples. The video processing chain includes a pre-processor (702) configured to reduce the value range (also referred to as numbering range) of incoming uncompressed pictures (701) (also referred to as the first series of uncompressed pictures). For example, the incoming uncompressed pictures (701) uses a YCrCb color space with 10 bits per sample (also referred to as bit depth of 10 bits or 10-bit sample depth), allowing 1024 different sample values. In some examples, the pre-processor (702) can reduce the bit depth of the samples to a lower sample depth of, for example 5 bits, allowing for a value range of 32 different values, which can include for example the values of 0 . . . 31. In some examples, the value range reduction is performed by linearly mapping the larger value range of the input samples to a smaller, consecutive sample range of the output samples, for example 0 . . . 1023 to 0 . . . 31, as that certain coding efficiency gains during encoding can be achieved. However, other linear or non-linear reductions in value range are also envisioned. For example, the reduction could be performed, while still creating a continuous numbering space of, for example, 0 . . . 31, by non-linear mapping (favoring dark or bright areas as required for the application), using a gamma function, a logarithmic function, or any other function. It is also envisioned that, in some examples, the mapping can result in a non-continuous numbering space. For example, assuming a 10-bit sample depth, the 5 least significant bits can be zeroed out (e.g., set to be zeroes) in an example.

In some examples, the resulting pre-processed samples can be stored as a second series of uncompressed pictures (703) that may be the input of a video encoder (704). In the FIG. 7 example, the second series of pictures (703) is shown here being smaller than the first series of uncompressed pictures (701) to emphasis that bit depth is reduced through preprocessing. It is noted that the spatial resolution of the first series of uncompressed pictures (701) and the second series of uncompressed pictures (703) can be the same.

The video encoder (704) can operate on (e.g., compress) the second series of uncompressed pictures (703) to generate a coded video bitstream (705), which may be stored, transmitted, or in other form made available to a video decoder (706). The video encoder (704) and the video decoder (706) may conform to any suitable video coding technology or standard, such as H.264, H.265, H.266, Vp9, AV1, or any variant thereof, including variants extending the video coding standard by specific tools targeting video coding for machines. The video decoder (706) can operate on the coded video bitstream (705) and translate into (generate) reconstructed pictures (707) (also referred to a third series of uncompressed pictures). The reconstructed pictures (707) can have substantially the same numbering range as the second series of pictures (703) that are input to the video encoder (704) and are hence depicted at the same (smaller) size as the second series of pictures (703). In the FIG. 7 example, a post-processor (708) is configured to apply the inverse of the mapping function of pre-processor (702) to map sample values of, for example, 0 . . . 31, to sample values commonly used for machine consumption, for example 0 . . . 1023. In some examples, the mapping function of the pre-processor (702) is referred to as forward truncation function, and the inverse of the mapping function of the pre-processor (702) is also referred to as reverse truncation function. The output of the post-processor (708) may therefore a fourth series of uncompressed pictures (709) in, for example, the same format, bit depth, color space, and so forth, as the first series of uncompressed pictures (701), although those pictures may include compression artifacts, including artifacts such as banding that may be a direct result of the reduction in sample value range. Such output pictures (e.g., the fourth series of uncompressed pictures (709), also referred to as recovered pictures or bit depth recovered pictures) may be used as an input of the machine task (710).

In some examples, in order for the post-processor (708) to apply the inverse function (e.g., reverse truncation function) of the pre-processor (702), the post-processor (708) needs to be informed what inverse function to use or what forward function (e.g., forward truncation function) has been used by the pre-processor (702).

In some examples, aforementioned information can be in the form of one or more SEI messages associated and included in one or more pictures of coded video sequence(s) (CVS) (720) that are in the coded video bitstream (705). The CVS (720) can include one or more coded pictures, such as three coded pictures (721), (722) and (723) shown in FIG. 7. As already described, a coded picture can include one or more SEI messages. In the FIG. 7 example, the coded picture (721) can include a bit depth truncation SEI message (724) that can be an example of a representation, in the form of an SEI message, of the reverse truncation function that the post-processor (708) can perform to convert the decoder-reconstructed third series of uncompressed pictures (707) into the fourth series of uncompressed pictures (709) that is input of the machine task (710). The bit depth truncation SEI message can have a persistence scope, which can be a set of reconstructed pictures to which the SEI message applies. The persistence scope can be established by syntax and semantics. In the FIG. 7 example, the SEI message's persistence scope may include all three pictures shown (721, 722, 723), but different persistence, such as only to a single picture, may also be possible.

The SEI message (724) can further include information about the forward truncation function used by pre-processor (702) or the reverse truncation function to be used by post-processor (708).

In some examples, as SEI messages are part of the coded video bitstream, the SEI messages can get advantageously included into the coded video bitstream by the video encoder (704) and extracted by the video decoder (706). In the FIG. 7 example, the pre-processor (702) and the video encoder (704) establish knowledge (711) through techniques, such as shared memory, a shared file, remote procedure call, or similar means, on the function (e.g., forward truncation function) that pre-processor (702) has employed, or the function (e.g., reverse truncation function) suggested to be employed by the post-processor (708), or a combination thereof. Similarly, the video decoder (706), after decoding the SEI message (724) can forward knowledge (712) of the forward truncation function or the reverse truncation function to the post-processor (708).

FIG. 8 shows a first example (800) of syntax and semantics of a bit depth truncation SEI message that may include information about forward truncation function or reverse truncation function. FIG. 9 shows a second example (900) of syntax and semantics of a somewhat more complex bit depth truncation SEI message that may include information about forward truncation functions or reverse truncation functions. In both of the first example (800) and the second example (900), a persistence scope may be established through a cancel flag mechanism. For example, in FIG. 8, a cancel_flag (801) may be unconditionally present in the SEI message syntax (800); and in FIG. 9, a cancel_flag (901) may be unconditionally present in the SEI message syntax (900). When the cancel flag is true (e.g., of value 1), then the picture in which the SEI message is included may not be subject to any SEI message data of that type. In this particular example, it means that the truncation parameters (discussed below) are undefined for this and following pictures, unless another SEI message of the same type and with the cancel flag (e.g., the cancel_flag (801), the cancel_flag (901)) equal to 0 is received.

In some examples, a determination whether the cancel flag is 0 is made, such as shown by (802) in FIGS. 8 and (902) in FIG. 9. When the cancel flag is false (e.g., of value 0), then truncation parameters, such as bit_depth_truncation_para as shown by (803) in FIG. 8, bit_depth_truncation_param_luma, bit_depth_truncation_param_cb and bit_depth_truncation_param_br shown by (903) in FIG. 9, are present. The difference between the first example (800) and the second example (900) is that truncation parameters may be signaled for all color planes in a single codeword, as shown by (803) in FIG. 8, or for each color plane (also referred to as color component) separately as shown by (903) in FIG. 9. It is noted that other similar combinations are also possible. For example, two truncation parameters can be signaled; one for luminance, and one for both chrominance components.

Also, in certain scenarios, where both machine and human use of reconstructed video is required, ancillary pictures can be used as a plane in which the bit depth truncation is performed, intended for machine processing, coded pictures are coded into by the video encoder (704) or taken from by the video decoder (706). For example, the preprocessor (702) can perform bit depth truncation to generate ancillary pictures from original pictures, the ancillary pictures and the original pictures are encoded by the video encoder (704) into the coded video bitstream (705). The video decoder (706) can perform decoding based on the coded video bitstream (705), and generate first reconstructed pictures and second reconstructed pictures. The first reconstructed pictures correspond to the original pictures, and the second reconstructed pictures correspond to the ancillary pictures. The first reconstructed pictures can be provided for human use, and the second reconstructed pictures (ancillary pictures) can be provided for machine use. It is noted that in some examples, the ancillary pictures may be used to code transparency, depth maps, and the like. According to an aspect of the disclosure, the SEI message can be used suitably to indicate the use of the ancillary pictures for various purposes, thus the ancillary pictures can be processed according to the indicated usage in the SEI message.

FIG. 8 also shows the semantics (804) for the truncation parameters and FIG. 9 also shows the semantics (904) for the truncation parameters. In some examples, the semantics (804) or (904) include the description of the function that pre-processor (702), post-processor (708), or both individually can use, either directly as or derivation, so to arrive at the function to be executed in the post-processor (708). In an example, the pre-processor (702) performs a forward truncation function for bi-depth truncation according to the semantics (804) or (904) to generate samples of a reduced bi depth. In the example, the post-processor (708) can perform a reverse truncation function for bit-depth truncation to generate samples of a recovered bi depth.

It is noted that the details of the semantics described by (804) and (904) are specified in C programing language-style pseudocode. It is noted that other suitable functions can be specified in whatever language may be appropriate.

It is noted that, in some examples, other high level syntax structures of video coding standards or technologies may also be an option for the coding of truncation and similar information instead of or in addition to the use of SEI messages. For example, in H.26x, the visual usability information (VUI) data structure, can be present in sequence or video parameter sets, can be an appropriate placement for the bit depth truncation information.

In some examples, the same truncation function is used throughout all the pictures of a CVS (720). In some other examples, different truncation functions can be used for different pictures within a CVS, the described mechanism can be adjusted to work; however, the coding efficiency gains realized through the limitation of the numbering space of the sample values would likely be at least partially offset, and perhaps eliminated to the point of a negative balance, by the additional prediction error when using inter-picture prediction between two pictures using different truncation functions. For that reason, in an example, the SEI message (724) is specified as a prefix SEI, and its persistence is set such that its scope includes all pictures of the CVS. According to the semantics of the first example (800) and/or the second example (900), the persistence scope of the SEI ends with the end of the CVS in the example, the inclusion of a single SEI message in the IRAP picture of the CVS may be advisable and sufficient in some scenarios.

It is noted that the techniques for truncated bit depth support SEI messages, described above, can be implemented as computer software using computer-readable instructions and physically stored in one or more computer-readable media.

Figures 10, 11:
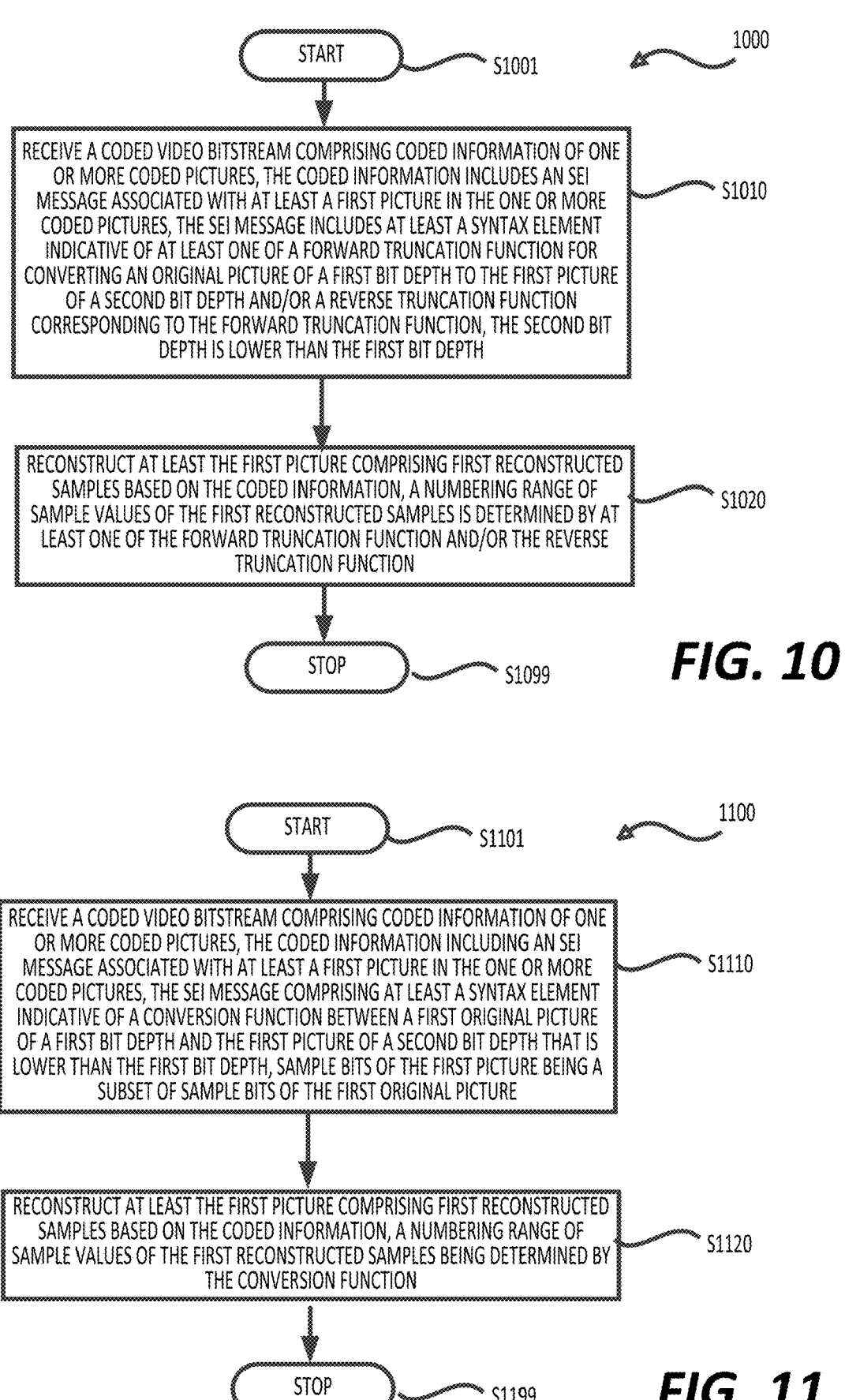
FIG. 10 shows a flow chart outlining a decoding process according to some embodiments of the disclosure.
FIG. 11 shows a flow chart outlining a decoding process according to some embodiments of the disclosure.

FIG. 10 shows a flow chart outlining a process (1000) according to an embodiment of the disclosure. The process (1000) can be used in a video decoder. In various embodiments, the process (1000) is executed by processing circuitry, such as the processing circuitry that performs functions of the video decoder (210), the processing circuitry that performs functions of the video decoder (310), the processing circuitry that performs functions of the video decoder (504), and the like. In some embodiments, the process (1000) is implemented in software instructions, thus when the processing circuitry executes the software instructions, the processing circuitry performs the process (1000). The process starts at (S1001) and proceeds to (S1010).

At (S1010), a coded video bitstream including coded information of one or more coded pictures is received. The coded information includes an SEI message associated with at least a first picture in the one or more coded pictures. The SEI message includes at least a syntax element indicative of at least one of a forward truncation function for converting an original picture of a first bit depth to the first picture of a second bit depth and/or a reverse truncation function corresponding to the forward truncation function. The reverse truncation function is an inverse function of the forward truncation function. For example, according to the reverse truncation function, a picture of the second bit depth is converted to a picture of the first bit depth. The second bit depth is lower than the first bit depth.

At (S1020), at least the first picture including first reconstructed samples are reconstructed based on the coded information, a numbering range of sample values of the first reconstructed samples is determined by at least one of the forward truncation function and/or the reverse truncation function.

According to an aspect of the disclosure, at least the syntax element indicates a bit shifting parameter in the forward truncation function and/or the reverse truncation function. In some examples, at least the syntax element includes a left bit shifting parameter that is used in the reverse truncation function. In some examples, at least the syntax element includes at least a first bit shifting parameter associated with a first color component, and a second bit shifting parameter associated with a second color component.

According to an aspect of the disclosure, a first recovered picture having the first bit depth is generated at least partially from the first reconstructed samples. In some examples, bits of a reconstructed sample are left-shifted of zeros to obtain a recovered sample having the first bit depth.

According to another aspect of the disclosure, bits of a first reconstructed sample are combined with bits of a second reconstructed sample to obtain a recovered sample of the first recovered picture having the first bit depth.

In some examples, the SEI message is of an encoder optimization information (EOI) type.

In some examples, the SEI message is of a dedicated bit depth truncation type.

Then, the process proceeds to (S1099) and terminates.

The process (1000) can be suitably adapted. Step(s) in the process (1000) can be modified and/or omitted. Additional step(s) can be added. Any suitable order of implementation can be used.

FIG. 11 shows a flow chart outlining a process (1100) according to an embodiment of the disclosure. The process (1100) can be used in a video decoder. In various embodiments, the process (1100) is executed by processing circuitry, such as the processing circuitry that performs functions of the video decoder (210), the processing circuitry that performs functions of the video decoder (310), the processing circuitry that performs functions of the video decoder (504), and the like. In some embodiments, the process (1100) is implemented in software instructions, thus when the processing circuitry executes the software instructions, the processing circuitry performs the process (1100). The process starts at (S1101) and proceeds to (S1110).

At (S1110), a coded video bitstream including coded information of one or more coded pictures is received. The coded information includes an SEI message associated with at least a first picture in the one or more coded pictures, the SEI message includes at least a syntax element indicative of a conversion function between a first original picture of a first bit depth and the first picture of a second bit depth that is lower than the first bit depth, sample bits of the first picture is a subset of sample bits of the first original picture.

At (S1120), at least the first picture including first reconstructed samples are reconstructed based on the coded information, a numbering range of sample values of the first reconstructed samples is determined based on the conversion function. For example, when the conversion function indicates a conversion from 10 bit depth to 5 bit depth, the numbering range of the sample values of the first reconstructed samples can range from 0 to 32; and when the conversion function indicates a conversion from 16 bit depth to 10 bit depth, the numbering range of the sample values of the first reconstructed samples can range from 0 to 1023.

In some examples, at least the syntax element indicates a bit shifting parameter for the conversion function.

In some examples, at least the syntax element indicates at least one of a forward truncation function and a reverse truncation function.

Then, the process proceeds to (S1199) and terminates.

The process (1100) can be suitably adapted. Step(s) in the process (1100) can be modified and/or omitted. Additional step(s) can be added. Any suitable order of implementation can be used.

FIG. 12 shows a flow chart outlining a process (1200) according to an embodiment of the disclosure. The process (1200) can be used in a video encoder. In various embodiments, the process (1200) is executed by processing circuitry, such as the processing circuitry that performs functions of the video encoder (220), the processing circuitry that performs functions of the video encoder (420), the processing circuitry that performs functions of the video encoder (502), and the like. In some embodiments, the process (1200) is implemented in software instructions, thus when the processing circuitry executes the software instructions, the processing circuitry performs the process (1200). The process starts at (S1201) and proceeds to (S1210).

At (S1210), a forward truncation function is performed on an original picture of a first bit depth to generate one or more pictures of a second bit depth, the second bit depth is lower than the first bit depth.

At (S1220), the one or more pictures are encoded to generate coded information of the one or more pictures.

At (S1230), an SEI message is included in a coded video bitstream of the coded information, the SEI message is associated with the one or more pictures, the SEI message includes at least a syntax element indicative of at least one of the forward truncation function and/or a reverse truncation function corresponding to the forward truncation function.

According to an aspect of the disclosure, at least the syntax element indicates a bit shifting parameter in the forward truncation function and/or the reverse truncation function. In some examples, at least the syntax element includes a left bit shifting parameter that is used in the reverse truncation function. In some examples, at least the syntax element includes at least a first bit shifting parameter associated with a first color component, and a second bit shifting parameter associated with a second color component.

In some examples, a sample of the one or more pictures is generated using a subset of bits of an original sample in the original picture.

In some examples, at least a first picture and a second picture are formed from the original picture, first samples of the first picture uses a first subset of bits of original samples of the original picture, second samples of the second picture uses a second subset of the bits of the original samples.

In some examples, the SEI message is of an encoder optimization information (EOI) type.

In some examples, the SEI message is of a dedicated bit depth truncation type.

Then, the process proceeds to (S1299) and terminates.

The process (1200) can be suitably adapted. Step(s) in the process (1200) can be modified and/or omitted. Additional step(s) can be added. Any suitable order of implementation can be used.

It is noted that the above techniques can be used to perform a conversion between a visual media file and a bitstream of visual media data according to a format rule. For example, the bitstream includes coded information of one or more coded pictures, the coded information includes a supplemental enhancement information (SEI) message associated with at least a first picture in the one or more coded pictures, the SEI message includes at least a syntax element indicative of at least one of a forward truncation function for converting an original picture of a first bit depth to the first picture of a second bit depth and/or a reverse truncation function corresponding to the forward truncation function, the second bit depth is lower than the first bit depth. The format rule specifies that at least the first picture including first reconstructed samples is reconstructed based on the coded information, a numbering range of sample values of the first reconstructed samples is determined by at least one of the forward truncation function and/or the reverse truncation function.

The techniques described above, can be implemented as computer software using computer-readable instructions and physically stored in one or more computer-readable media. For example, FIG. 13 shows a computer system (1300) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 13:
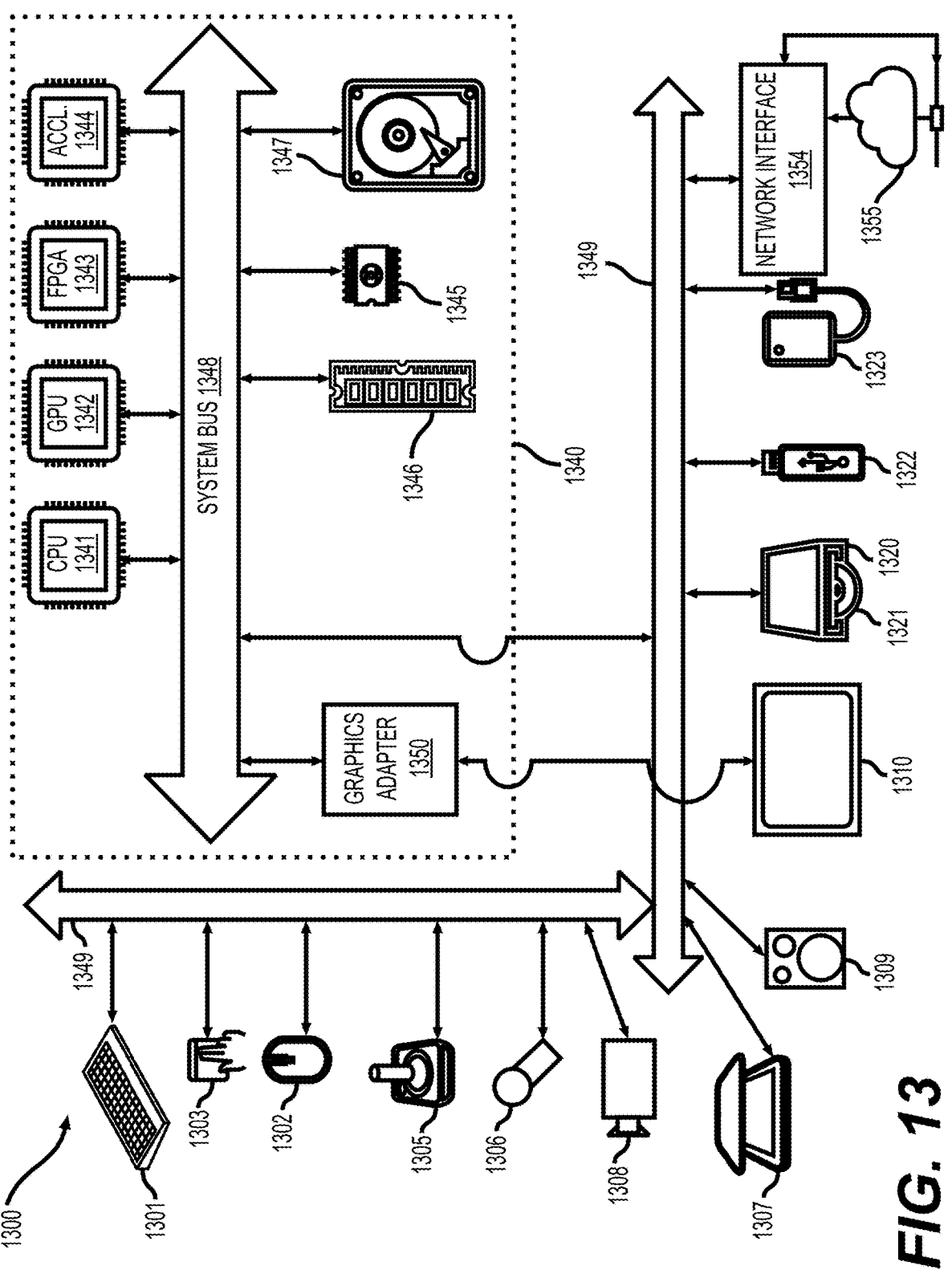
FIG. 13 is a schematic illustration of a computer system in accordance with an embodiment.

The components shown in FIG. 13 for computer system (1300) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1300).

Computer system (1300) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1301), mouse (1302), trackpad (1303), touch screen (1310), data-glove (not shown), joystick (1305), microphone (1306), scanner (1307), camera (1308).

Computer system (1300) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1310), data-glove (not shown), or joystick (1305), but there can also be tactile feedback devices that do not serve as input devices), audio output devices (such as: speakers (1309), headphones (not depicted)), visual output devices (such as screens (1310) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1300) can also include human accessible storage devices and their associated media such as optical media including CD/DVD ROM/RW (1320) with CD/DVD or the like media (1321), thumb-drive (1322), removable hard drive or solid state drive (1323), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1300) can also include an interface (1354) to one or more communication networks (1355). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1349) (such as, for example USB ports of the computer system (1300)); others are commonly integrated into the core of the computer system (1300) by attachment to a system bus as described below (for example Ethernet interface into a PC computer system or cellular network interface into a smartphone computer system). Using any of these networks, computer system (1300) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1340) of the computer system (1300).

The core (1340) can include one or more Central Processing Units (CPU) (1341), Graphics Processing Units (GPU) (1342), specialized programmable processing units in the form of Field Programmable Gate Areas (FPGA) (1343), hardware accelerators for certain tasks (1344), graphics adapters (1350), and so forth. These devices, along with Read-only memory (ROM) (1345), Random-access memory (1346), internal mass storage such as internal non-user accessible hard drives, SSDs, and the like (1347), may be connected through a system bus (1348). In some computer systems, the system bus (1348) can be accessible in the form of one or more physical plugs to enable extensions by additional CPUs, GPU, and the like. The peripheral devices can be attached either directly to the core's system bus (1348), or through a peripheral bus (1349). In an example, the screen (1310) can be connected to the graphics adapter (1350). Architectures for a peripheral bus include PCI, USB, and the like.

CPUs (1341), GPUs (1342), FPGAs (1343), and accelerators (1344) can execute certain instructions that, in combination, can make up the aforementioned computer code. That computer code can be stored in ROM (1345) or RAM (1346). Transitional data can also be stored in RAM (1346), whereas permanent data can be stored for example, in the internal mass storage (1347). Fast storage and retrieve to any of the memory devices can be enabled through the use of cache memory, that can be closely associated with one or more CPU (1341), GPU (1342), mass storage (1347), ROM (1345), RAM (1346), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1300), and specifically the core (1340) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1340) that are of non-transitory nature, such as core-internal mass storage (1347) or ROM (1345). The software implementing various embodiments of the present disclosure can be stored in such devices and executed by core (1340). A computer-readable medium can include one or more memory devices or chips, according to particular needs. The software can cause the core (1340) and specifically the processors therein (including CPU, GPU, FPGA, and the like) to execute particular processes or particular parts of particular processes described herein, including defining data structures stored in RAM (1346) and modifying such data structures according to the processes defined by the software. In addition or as an alternative, the computer system can provide functionality as a result of logic hardwired or otherwise embodied in a circuit (for example: accelerator (1344)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

(1) A method of video decoding, the method including: receiving a coded video bitstream comprising coded information of one or more coded pictures, the coded information including a supplemental enhancement information (SEI) message associated with at least a first picture in the one or more coded pictures, the SEI message comprising at least a syntax element indicative of at least one of a forward truncation function for converting an original picture of a first bit depth to the first picture of a second bit depth and/or a reverse truncation function corresponding to the forward truncation function, the second bit depth being lower than the first bit depth; and reconstructing at least the first picture comprising first reconstructed samples based on the coded information, a numbering range of sample values of the first reconstructed samples being determined by at least one of the forward truncation function and/or the reverse truncation function.

(2) The method of feature (1), in which at least the syntax element indicates a bit shifting parameter in the forward truncation function and/or the reverse truncation function.

(3) The method of any of features (1) to (2), in which at least the syntax element includes a left bit shifting parameter that is used in the reverse truncation function.

(4) The method of any of features (1) to (3), in which at least the syntax element includes at least a first bit shifting parameter associated with a first color component, and a second bit shifting parameter associated with a second color component.

(5) The method of any of features (1) to (4), the method including: generating a first recovered picture having the first bit depth at least partially from the first reconstructed samples.

(6) The method of any of features (1) to (5), the method including: left-shifting bits of a reconstructed sample to obtain a recovered sample having the first bit depth.

(7) The method of any of features (1) to (6), the method including: combining bits of a first reconstructed sample with bits of a second reconstructed sample to obtain a recovered sample of the first recovered picture having the first bit depth.

(8) The method of any of features (1) to (7), in which the SEI message is of an encoder optimization information (EOI) type.

(9) The method of any of features (1) to (8), in which the SEI message is of a dedicated bit depth truncation type.

(10) A method of video encoding, the method including: applying a forward truncation function on an original picture of a first bit depth to generate one or more pictures of a second bit depth, the second bit depth being lower than the first bit depth; encoding the one or more pictures to generate coded information of the one or more pictures; and including, in a coded video bitstream of the coded information, a supplemental enhancement information (SEI) message associated with the one or more pictures, the SEI message comprising at least a syntax element indicative of at least one of the forward truncation function and/or a reverse truncation function corresponding to the forward truncation function.

(11) The method of feature (10), in which the syntax element indicates a bit shifting parameter in the forward truncation function and/or the reverse truncation function.

(12) The method of any of features (10) to (11), in which at least the syntax element includes a left bit shifting parameter that is used in the reverse truncation function.

(13) The method of any of features (10) to (12), in which at least the syntax element includes at least a first bit shifting parameter associated with a first color component, and a second bit shifting parameter associated with a second color component.

(14) The method of any of features (10) to (13), the method including: generating a sample of the one or more pictures using a subset of bits of an original sample in the original picture

(15) The method of any of features (10) to (14), the method including: forming at least a first picture and a second picture from the original picture, first samples of the first picture using a first subset of bits of original samples of the original picture, second samples of the second picture using a second subset of the bits of the original samples.

(16) The method of any of features (10) to (15), in which the SEI message is of an encoder optimization information (EOI) type.

(17) The method of any of features (10) to (16), in which the SEI message is of a dedicated bit depth truncation type.

(18) A method of video decoding, the method including: receiving a coded video bitstream comprising coded information of one or more coded pictures, the coded information including a supplemental enhancement information (SEI) message associated with at least a first picture in the one or more coded pictures, the SEI message comprising at least a syntax element indicative of a conversion function between a first original picture of a first bit depth and the first picture of a second bit depth that is lower than the first bit depth, sample bits of the first picture being a subset of sample bits of the first original picture; and reconstructing at least the first picture comprising first reconstructed samples based on the coded information, a numbering range of sample values of the first reconstructed samples being determined based on the conversion function.

(19) The method of feature (18), in which at least the syntax element indicates a bit shifting parameter for the conversion function.

(20) The method of any of features (18) to (19), in which at least the syntax element indicates at least one of a forward truncation function and a reverse truncation function.

(21) A method of processing visual media data, the method including processing a bitstream of visual media data according to a format rule. The bitstream includes coded information of one or more coded pictures, the coded information including a supplemental enhancement information (SEI) message associated with at least a first picture in the one or more coded pictures, the SEI message comprising at least a syntax element indicative of at least one of a forward truncation function for converting an original picture of a first bit depth to the first picture of a second bit depth and/or a reverse truncation function corresponding to the forward truncation function, the second bit depth being lower than the first bit depth. The format rule specifies that at least the first picture comprising first reconstructed samples is reconstructed based on the coded information, a numbering range of sample values of the first reconstructed samples being determined by at least one of the forward truncation function and/or the reverse truncation function.

(22) An apparatus for video decoding, including processing circuitry that is configured to perform the method of any of features (1) to (9) and (18) to (20).

(23) An apparatus for video encoding, including processing circuitry that is configured to perform the method of any of features (10) to (17).

(24) A non-transitory computer-readable storage medium storing instructions which when executed by at least one processor cause the at least one processor to perform the method of any of features (1) to (21).

What is claimed is:
1. A method of video decoding, comprising:
  receiving a coded video bitstream comprising coded information of one or more coded pictures, the coded information including a supplemental enhancement information (SEI) message associated with at least a first picture in the one or more coded pictures, the SEI message comprising at least a syntax element indicative of at least one of a forward truncation function for converting an original picture of a first bit depth to the first picture of a second bit depth and/or a reverse truncation function corresponding to the forward truncation function, the second bit depth being lower than the first bit depth; and reconstructing at least the first picture comprising first reconstructed samples based on the coded information, a numbering range of sample values of the first reconstructed samples being determined by at least one of the forward truncation function and/or the reverse truncation function.

2. The method of claim 1, wherein at least the syntax element indicates a bit shifting parameter in the forward truncation function and/or the reverse truncation function.

3. The method of claim 2, wherein at least the syntax element includes a left bit shifting parameter that is used in the reverse truncation function.

4. The method of claim 2, wherein at least the syntax element includes at least a first bit shifting parameter associated with a first color component, and a second bit shifting parameter associated with a second color component.

5. The method of claim 1, further comprising:

generating a first recovered picture having the first bit depth at least partially from the first reconstructed samples.

6. The method of claim 5, wherein the generating comprises:

left-shifting bits of a reconstructed sample to obtain a recovered sample having the first bit depth.

7. The method of claim 5, wherein the generating comprises:

combining bits of a first reconstructed sample with bits of a second reconstructed sample to obtain a recovered sample of the first recovered picture having the first bit depth.

8. The method of claim 1, wherein the SEI message is of an encoder optimization information (EOI) type.

9. The method of claim 1, wherein the SEI message is of a dedicated bit depth truncation type.

10. A method of video encoding, comprising:

applying a forward truncation function on an original picture of a first bit depth to generate one or more pictures of a second bit depth, the second bit depth being lower than the first bit depth;

encoding the one or more pictures to generate coded information of the one or more pictures; and including, in a coded video bitstream of the coded information, a supplemental enhancement information (SEI) message associated with the one or more pictures, the SEI message comprising at least a syntax element indicative of at least one of the forward truncation function and/or a reverse truncation function corresponding to the forward truncation function.

11. The method of claim 10, wherein at least the syntax element indicates a bit shifting parameter in the forward truncation function and/or the reverse truncation function.

12. The method of claim 11, wherein at least the syntax element includes a left bit shifting parameter that is used in the reverse truncation function.

13. The method of claim 11, wherein at least the syntax element includes at least a first bit shifting parameter associated with a first color component, and a second bit shifting parameter associated with a second color component.

14. The method of claim 10, wherein the applying comprises:

generating a sample of the one or more pictures using a subset of bits of an original sample in the original picture.

15. The method of claim 10, wherein the applying comprises:

forming at least a first picture and a second picture from the original picture, first samples of the first picture using a first subset of bits of original samples of the original picture, second samples of the second picture using a second subset of the bits of the original samples.

16. The method of claim 10, wherein the SEI message is of an encoder optimization information (EOI) type.

17. The method of claim 10, wherein the SEI message is of a dedicated bit depth truncation type.

18. A method of video decoding, comprising:

receiving a coded video bitstream comprising coded information of one or more coded pictures, the coded information including a supplemental enhancement information (SEI) message associated with at least a first picture in the one or more coded pictures, the SEI message comprising at least a syntax element indicative of a conversion function between a first original picture of a first bit depth and the first picture of a second bit depth that is lower than the first bit depth, sample bits of the first picture being a subset of sample bits of the first original picture; and reconstructing at least the first picture comprising first reconstructed samples based on the coded information, a numbering range of sample values of the first reconstructed samples being determined based on the conversion function.

19. The method of claim 18, wherein at least the syntax element indicates a bit shifting parameter for the conversion function.

20. The method of claim 18, wherein at least the syntax element indicates at least one of a forward truncation function and a reverse truncation function.

* * * * *